United States Patent
Kasaiezadeh Mahabadi et al.

(10) Patent No.: US 11,934,258 B1
(45) Date of Patent: Mar. 19, 2024

(54) VEHICLE DATA ANALYTICS SYSTEM FOR MULTI-LAYER CONTROL SOFTWARE ARCHITECTURE

(71) Applicant: GM Global Technology Operations LLC, Detroit, MI (US)

(72) Inventors: SeyedAlireza Kasaiezadeh Mahabadi, Novi, MI (US); Hassan Askari, Thornhill (CA); Amir Abolhassani, Plymouth, MI (US); Mansour Ataei, Richmond Hill (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/063,262

(22) Filed: Dec. 8, 2022

(51) Int. Cl.
*G06F 11/07* (2006.01)
*B60W 50/02* (2012.01)

(52) U.S. Cl.
CPC ....... *G06F 11/079* (2013.01); *B60W 50/0205* (2013.01); *G06F 11/0739* (2013.01)

(58) Field of Classification Search
CPC .............. G06F 11/079; G06F 11/0739; B60W 50/0205
See application file for complete search history.

(56) References Cited

U.S. PATENT DOCUMENTS

| | | | |
|---|---|---|---|
| 10,202,125 B2 | 2/2019 | Mahabadi et al. | |
| 11,841,761 B2 * | 12/2023 | Lin | G06F 11/0706 |
| 2022/0035359 A1 * | 2/2022 | Yu | G06F 16/2465 |

* cited by examiner

*Primary Examiner* — Nadeem Iqbal
(74) *Attorney, Agent, or Firm* — Vivacqua Crane, PLLC

(57) ABSTRACT

A data analytics system for a vehicle includes one or more controllers having a multi-layered control software architecture including two or more software layers and a health monitoring structure. The one or more controllers execute instructions to receive a fault, and in response to receiving the fault, generate, by the health monitoring structure, a plurality of unique triggers as the fault propagates throughout the multi-layered control software architecture. The controllers build a network including a plurality of propagation paths and identify one or more main propagation paths that are part of the network based on a data analysis of a mock big data set. The one or more controllers build a complete propagation pathway including two or more main propagation paths. In response to determining only one main propagation path, the controllers determine a root cause of the fault based on the only one main propagation path.

20 Claims, 5 Drawing Sheets

VEHICLE DATA ANALYTICS SYSTEM FOR MULTI-LAYER CONTROL SOFTWARE ARCHITECTURE

INTRODUCTION

The present disclosure relates to a vehicle data analytics system for one or more controllers including a multi-layer control software architecture having two or more software layers. The data analytics system identifies a root cause of a fault received by the controllers based on one or more propagation paths that the fault follows through the multi-layer control software architecture.

Many vehicles today are equipped with motion control systems for enhancing driver control. The motion control system for a vehicle includes at least one controller having a multi-layer control architecture. The highest software layer of the control architecture, which is referred to as the level one software layer, is directed towards global control environments. The software layer immediately below the level one layer is directed towards specific local dynamic control such as, for example, axle behavior. The software layers below the local dynamic control are directed towards specific actuators and sensors.

The controllers of the vehicle motion control system may be monitored and assessed by a health monitoring system, and a data recording infrastructure may be provided for recording data collected by the controllers. A manual process may be employed to review data recorded by the data recording infrastructure to determine the root cause of a fault. That is, a subject matter expert, who is an individual with specialized knowledge regarding the vehicle motion control system, may review the data collected by the data recording infrastructure to identify the root cause of the fault.

Thus, while vehicle motion control systems achieve their intended purpose, there is a need in the art for an improved, data-driven approach to identifying the root cause of a fault.

SUMMARY

According to several aspects, a data analytics system for a vehicle is disclosed, and includes one or more controllers including a multi-layered control software architecture including two or more software layers and a health monitoring structure. The one or more controllers executes instructions to receive a fault. In response to receiving the fault, the one or more controllers generate, by the health monitoring structure, a plurality of unique triggers as the fault propagates throughout the multi-layered control software architecture. The one or more controllers build a network including a plurality of propagation paths, where each propagation path represents when the fault activates a first unique trigger in a lower software layer and propagates to a higher software layer to activate a second unique trigger. The one or more controllers identify one or more main propagation paths that are part of the network based on a data analysis of a mock big data set. The one or more controllers build a complete propagation pathway that includes two or more main propagation paths, where the complete propagation pathway follows the fault from a bottommost software layer to a global software layer of the multi-layered control software architecture. In response to determining only one main propagation path exists within the network, the one or more controllers determine a root cause of the fault based on the only one main propagation path.

In an aspect, in response to determining more than one main propagation path exists within the network, the one or more controllers confirm each of the more than one main propagation paths are valid.

In another aspect, the one or more controllers execute instructions to confirm a specific main propagation path is valid based on a timing signature of the specific main propagation path, where the timing signature indicates a predetermined amount of time.

In still another aspect, the predetermined amount of time is measured between a first point in time when the fault is received by the lower software layer and generates the first unique trigger and a second point in time when the fault propagates to the higher level software layer and generates the second unique trigger.

In an aspect, the one or more controllers execute instructions to confirm a specific main propagation path is valid based on a machine learning model.

In another aspect, the one or more controllers execute instructions to determine more than one potential root cause exists and express each root cause as a probability.

In still another aspect, the root cause of the fault is determined by tracing the complete propagation pathway back to a node that corresponds to a unique trigger that is part of the plurality of unique triggers in a bottommost software layer, and determining an identity of the unique trigger in the bottommost software layer, where the identity of the unique trigger indicates the root cause of the fault.

In an aspect, the one or more controllers execute instructions to determine a correlation coefficient between two unique triggers for each of the plurality of unique triggers.

In another aspect, the one or more controllers execute instructions to build the network including the plurality of propagation paths based on a sign of the correlation coefficient for each of the plurality of unique triggers.

In still another aspect, the network includes a plurality of nodes that each represent one of the unique triggers.

In an aspect, each propagation path connects two corresponding nodes to one another.

In another aspect, the mock big data set is a big data set that includes various data points collected from multiple vehicles that capture a plurality of events over a time horizon.

In still another aspect, the data analysis includes identifying the one or more main propagation paths by counting a number of times a plurality of faults travels through a specific propagation path for each of the plurality of propagation paths that are part of the network, and selecting propagation paths that the plurality of faults travels through most frequently as the one or more main propagation paths.

In an aspect, the data analysis identifies the one or more main propagation paths by counting a number of times a plurality of faults travels through a specific propagation path for each of the plurality of propagation paths that are part of the network.

In another aspect, a method for determining a root cause of a fault by a data analytics system for a vehicle is disclosed. The method includes receiving, by one or more controllers, a fault, where the one or more controllers including a multi-layered control software architecture including two or more software layers and a health monitoring structure. In response to receiving the fault, the method includes generating, by the health monitoring structure, a plurality of unique triggers as the fault propagates throughout the multi-layered control software architecture. The method includes building a network including a plurality of propagation paths, where each propagation path represents when the fault activates a first unique trigger in a lower software layer and propagates to a higher software layer to activate a second unique trigger. The method includes identifying one or more main propagation paths that are part of the network based on a data analysis of a mock big data set. The method includes building a complete propagation pathway that includes two or more main propagation paths, where the complete propagation pathway follows the fault from a bottommost software layer to a global software layer of the multi-layered control software architecture. In response to determining only one main propagation path exists within the network, the method includes determining a root cause of the fault based on the only one main propagation path.

In still another aspect, a data analytics system for a vehicle is disclosed, and includes one or more controllers including a multi-layered control software architecture including two or more software layers and a health monitoring structure. The one or more controllers execute instructions to receive a fault and in response to receiving the fault, generate, by the health monitoring structure, a plurality of unique triggers as the fault propagates throughout the multi-layered control software architecture. The one or more controllers build a network including a plurality of propagation paths, where each propagation path represents when the fault activates a first unique trigger in a lower software layer and propagates to a higher software layer to activate a second unique trigger. The one or more controllers identify one or more main propagation paths that are part of the network based on a data analysis of a mock big data set. The one or more controllers build a complete propagation pathway that includes two or more main propagation paths, where the complete propagation pathway follows the fault from a bottommost software layer to a global software layer of the multi-layered control software architecture. In response to determining only one main propagation path exists within the network, the one or more controllers determine a root cause of the fault based on the only one main propagation path. In response to determining more than one main propagation path exists within the network, the one or more controllers confirm each of the more than one main propagation paths are valid based on one of the following: a timing signature of a specific main propagation path and a machine learning model.

In another aspect, a predetermined amount of time is measured between a first point in time when the fault is received by the lower software layer and generates the first unique trigger and a second point in time when the fault propagates to the higher level software layer and generates the second unique trigger.

In still another aspect, the one or more controllers execute instructions to determine more than one potential root cause exists and express each root cause as a probability.

In an aspect, the root cause of the fault is determined by tracing the complete propagation pathway back to a node that corresponds to a unique trigger that is part of the plurality of unique triggers in a bottommost software layer, and determining an identity of the unique trigger in the bottommost software layer, wherein the identity of the unique trigger indicates the root cause of the fault.

In another aspect, the one or more controllers execute instructions to determine a correlation coefficient between two unique triggers for each of the plurality of unique triggers and build the network including the plurality of propagation paths based on a sign of the correlation coefficient for each of the plurality of unique triggers.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
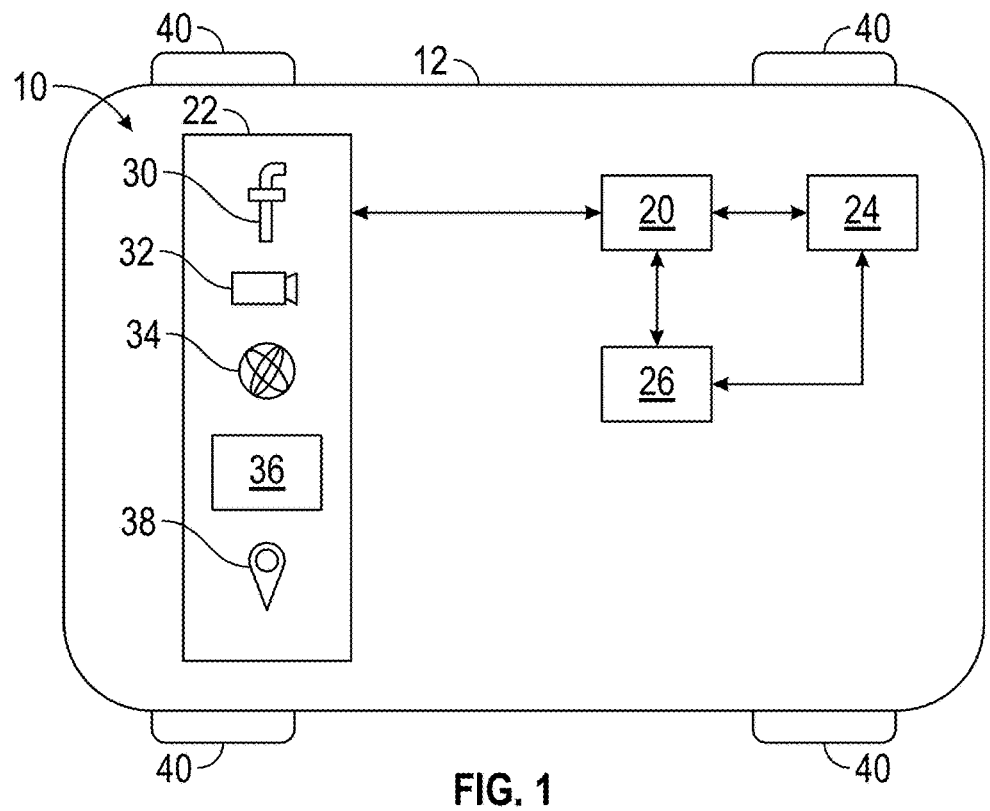
FIG. 1 is a schematic diagram of a vehicle including the disclosed data analytics system including one or more controllers, according to an exemplary embodiment.

Referring to FIG. 1, an exemplary data analytics system 10 for a vehicle 12 is illustrated. It is to be appreciated that the vehicle 12 may be any type of vehicle such as, but not limited to, a sedan, truck, sport utility vehicle, van, or motor home. The data analytics system 10 includes one or more controllers 20 in electronic communication with a plurality of sensors 22 configured to monitor data indicative of a dynamic state of the vehicle 12. In the non-limiting embodiment as shown in FIG. 1, the plurality of sensors 22 include one or more wheel speed sensors 30 for measuring an angular wheel speed velocity of one or more wheels 40 of the vehicle 12, one or more cameras 32, an inertial measurement unit (IMU) 34, one or more steering angle sensors 36, and a global positioning system (GPS) 38, however, is to be appreciated that additional sensors may be used as well. The one or more controllers 20 are also in electronic communication with a data recording infrastructure 24 and one or more vehicle control systems 26. Some examples of vehicle control systems 26 include, but are not limited to, an electronic all-wheel-drive (eAWD) system and an electronic limited slip differential (eLSD) system.

Figure 2:
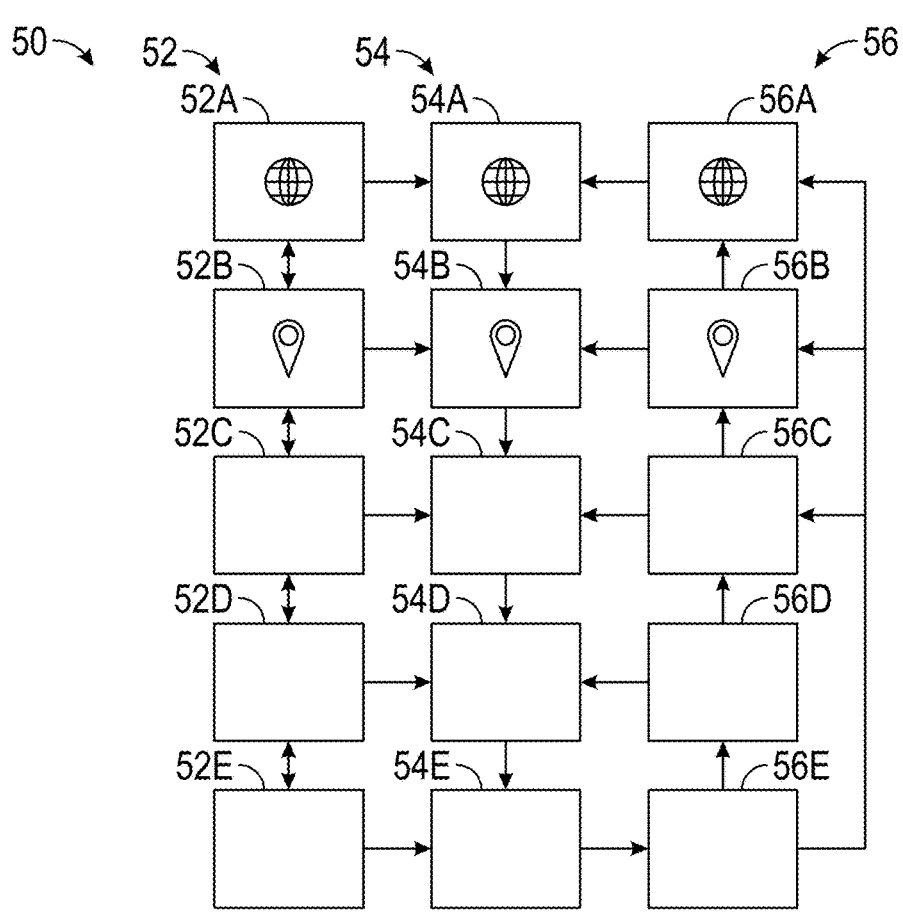
FIG. 2 is a diagram of a multi-layered control software architecture of the one or more controllers shown in FIG. 1, according to an exemplary embodiment.

The one or more controllers 20 include a tiered or multi-layered control software architecture 50 that includes two or more software layers 52 (shown in FIG. 2). It is to be appreciated that while the data analytics system 10 is illustrated as part of a motion control system for the vehicle 12, the figures are merely exemplary in nature and the data analytics system 10 is not limited to a vehicle motion controller. Indeed, the data analytics system 10 may be implemented in any application that employs multi-layered control software architecture.

FIG. 2 is a diagram of the multi-layered control software architecture 50 that includes two or more software layers 52 of the one or more controllers 20 shown in FIG. 1. Specifically, the multi-layered control software architecture 50 includes a global layer 52A, a local layer 52B, an actuator requirement layer 52C, a local actuator dynamics level 52D, and a hardware layer 52E. The global layer 52A corresponds to a first level of the multi-layered control software architecture 50 and controls overall vehicle dynamic functions. The local layer 52B controls local dynamic functions that are specific to one of the vehicle control systems 26, such as the eAWD system of the eLSD system. The actuator requirement layer 52C corresponds to a specific actuator that is part of one of the vehicle control systems 26 of the vehicle 12. The local actuator dynamics level 52D controls actuator dynamic functions, and the hardware layer 52E monitors the data indicative of the dynamic state of the vehicle 12 from the plurality of sensors 22 (FIG. 1).

Each software layer 52 includes a respective control layer 54 and a respective estimator layer 56, where the respective control layer 54 and the respective estimator layer 56 for a specific software layer 52 are in communication with the remaining software layers 52 that are part of the multi-layered control software architecture 50. The control layer 54 calculates a target action based on the data indicative of the dynamic state of the vehicle 12 from the plurality of sensors 22 (FIG. 1) and the estimator layer 56 estimates a dynamic state of the vehicle 12 based on the data indicative of the dynamics state of the vehicle 12 from the plurality of sensors 22. The global layer 52A of the two or more software layers 52 includes a global control layer 54A and a global state estimator layer 56A. The global control layer 54A calculates one or more parameters that indicate a target action that the vehicle 12 executes at a global control point. Some examples of the parameters that indicate the target actions at global control points include, but are not limited to, target longitudinal acceleration, target longitudinal velocity, target slip tracking, target lateral acceleration, target velocity, and target yaw rate tracking. The global state estimator layer 56A calculates one or more parameters that indicate a global state of the vehicle 12 at the global control point. Some examples of the parameters that indicate the global state of the vehicle 12 include, but are not limited to, a longitudinal acceleration estimate, a longitudinal velocity estimate, a longitudinal slip, a lateral velocity estimate, and a lateral acceleration estimate.

The local layer 52B includes a local dynamics control layer 54B and a local dynamics state estimation layer 56B. The local dynamics control layer 54B calculates one or more parameters that indicate a target action that the vehicle 12 executes at a local control point. Some examples of the target actions at the local control points include, but are not limited to, wheel control, active down force control, eAWD control, eLSD control, and active rear-wheel steering (ARS) control. The local dynamics state estimation layer 56B calculates one or more parameters indicating a local dynamics state at the local control point. Some examples of the local dynamics state of the vehicle 12 include, but are not limited to, a body state estimate, wheel state estimate, road state estimate, and tire force estimate.

The actuator requirement layer 52C includes an actuator control layer 54C and an actuation state estimation layer 56C. The actuator control layer 54C calculates one or more parameters that indicate a target action executed by a target actuator. Some examples of the target action executed by the target actuator include, but are not limited to, eLSD torque commands, gurney commands, rear wing commands, steering commands, engine commands, and electric motor commands. The actuation state estimation layer 56C calculates one or more parameters indicating a state of the target actuator. Some examples of the state of the actuator include, but are not limited to, an actuator based estimate, a sensor based estimate, and a corner torque.

The local actuator dynamics level 52D includes a local actuator dynamics actuator control layer 54D and a local actuator dynamics state estimation layer 56D. The local actuator dynamics actuator control layer 54D calculates one or more parameters that indicate a target variable created by the target actuator. Some examples of the target variable generated by the target actuator include current and voltage values. Specifically, in an embodiment, some examples of the target variable include, but are not limited to, delivered eLSD torque, delivered down force, delivered axle torque, and delivered wheel torque. The local actuator dynamics state estimation layer 56D calculates one or more parameters indicating a local actuator state of the target actuator. Some examples of the local actuator dynamics state of the target actuator include, but are not limited to, steering angle, steering torque, and wheel velocity. Finally, the hardware layer 52E includes hardware 54E and a sensor processing layer 56E. The hardware 54E includes sensors, such as the plurality of sensors 22 shown in FIG. 1, where the hardware 54E collects and sends variables that indicate the dynamic state of the vehicle 12 to the sensor processing layer 56E.

Figure 3:
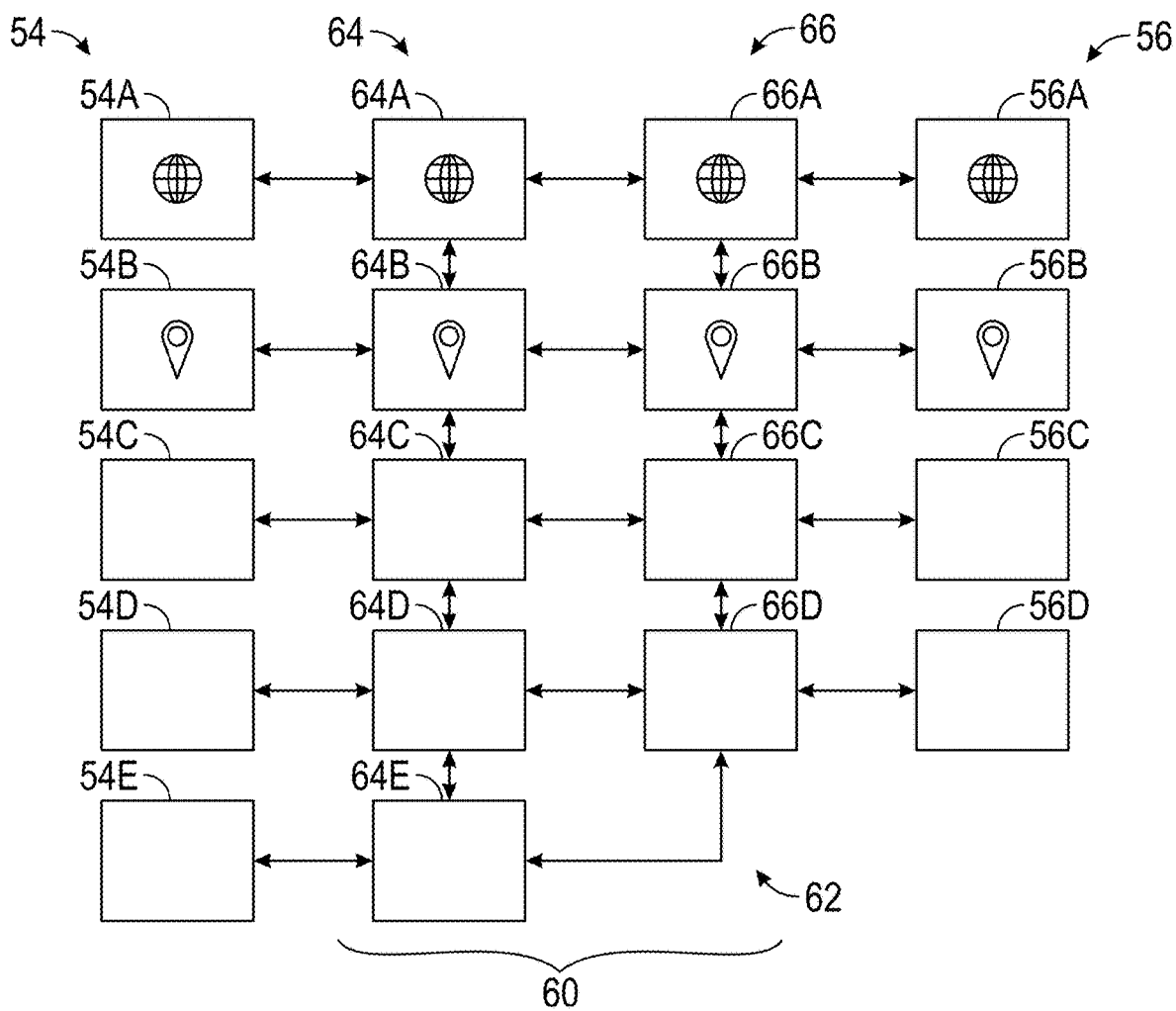
FIG. 3 is a diagram of a health monitoring structure for monitoring the multi-layered control software architecture shown in FIG. 2, according to an exemplary embodiment.

Referring now to FIG. 3, the multi-layered control software architecture 50 also includes a health monitoring structure 60 that monitors the software layers 52 of the multi-layered control software architecture 50 of the one or more controllers 20. As explained below, the health monitoring structure 60 monitors the software layers 52 and compares a respective parameter of a respective software layer 52 with a predetermined corresponding performance metric for a required time horizon. In response to determining the respective parameter of the respective software layer 52 does not meet the predetermined corresponding performance metric for the required time horizon, the health monitoring structure 60 generates a unique trigger that instructs the data recording infrastructure 24 (shown in FIG. 1) to record the one or more parameters calculated by each of the two or more software layers 52. Therefore, it follows that each software layer 52 of the multi-layered control software architecture 50 is monitored by the health monitoring structure 60, which in turn allows for an entire sequence of events to be detected and recorded by the data recording infrastructure 24.

The health monitoring structure 60 includes a plurality of health software layers 62 that each correspond to each of the respective software layers 52 of the multi-layered control software architecture 50 shown in FIG. 2. Referring to both FIGS. 2 and 3, the health monitoring structure 60 includes a control health monitoring layer 64 that corresponds to the control layer 54. Specifically, the control health monitoring layer 64 includes a global control health monitoring layer 64A, a local dynamics control health monitoring layer 64B, an actuator control health monitoring layer 64C, a local actuator dynamics control health monitoring layer 64D, and a hardware health monitoring layer 64E. The global control health monitoring layer 64A monitors the parameters that indicate the target actions at global control points generated by the global control layer 54A. The local dynamics control health monitoring layer 64B monitors the one or more parameters that indicate the target action that the vehicle 12 executes at the local control point generated by the local dynamics control layer 54B. The actuator control health monitoring layer 64C monitors the target actions at the actuator generated by the actuator control layer 54C. The local actuator dynamics control health monitoring layer 64D monitors the one or more parameters that indicate the target variable generated by the target actuator generated by the local actuator dynamics actuator control layer 54D. Finally, the hardware health monitoring layer 64E monitors a health of the hardware 54E, which includes the plurality of sensors 22 shown in FIG. 1. It is to be appreciated that the global control health monitoring layer 64A, the local dynamics control health monitoring layer 64B, the actuator control health monitoring layer 64C, the local actuator dynamics control health monitoring layer 64D, and the hardware health monitoring layer 64E each include one or more unique triggers.

The health monitoring structure 60 includes an estimator health monitoring layer 66 that corresponds to the estimator layer 56. Specifically, the estimator health monitoring layer 66 includes a global state estimation health monitoring layer 66A, a local dynamics state estimation health monitoring layer 66B, an actuator state estimation health monitoring layer 66C, and a local actuator dynamics state estimation health monitoring layer 66D. The global state estimation health monitoring layer 66A monitors the one or more parameters that indicate the global state of the vehicle 12 at the global control point calculated by the global state estimator layer 56A. The local dynamics state estimation health monitoring layer 66B monitors the one or more parameters indicating the local dynamics state at the local control point calculated by the local dynamics state estimation layer 56B. The actuator state estimation health monitoring layer 66C monitors the one or more parameters indicating the state of the target actuator calculated by the actuation state estimation layer 56C. The local actuator dynamics state estimation health monitoring layer 66D monitors the one or more parameters indicating the local actuator state of the target actuator calculated by the local actuator dynamics state estimation layer 56D. The local actuator dynamics state estimation health monitoring layer 66D also monitors a health of the hardware health monitoring layer 64E. It is to be appreciated that the global state estimation health monitoring layer 66A, the local dynamics state estimation health monitoring layer 66B, the actuator state estimation health monitoring layer 66C, and the local actuator dynamics state estimation health monitoring layer 66D each include one or more unique triggers.

Figure 4:
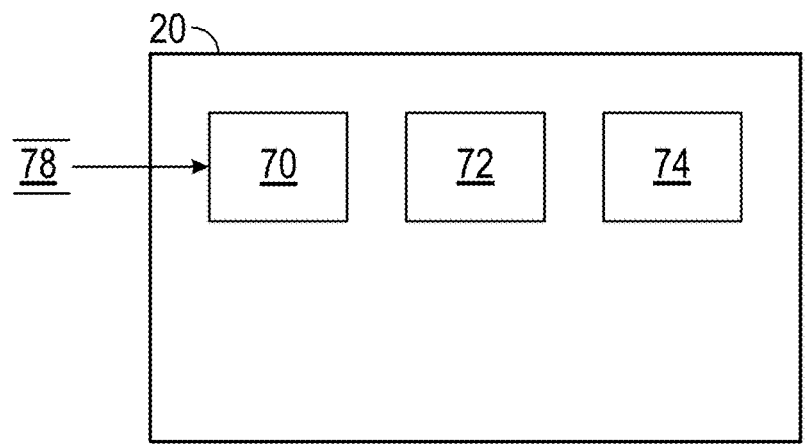
FIG. 4 is a diagram of the one or more controllers shown in FIG. 1, according to an exemplary embodiment.

FIG. 4 is a block diagram of the one or more controllers 20 shown in FIG. 1, where the one or more controllers 20 include a correlation analysis module 70, a network module 72, and a root cause module 74. As explained below, the one or more controllers 20 of the data analytics system 10 (FIG. 1) identify a root cause of a fault 78 received by the one or more controllers 20. The root cause of the fault 78 is determined based on one or more propagation paths 92 (FIG. 6) that the fault 78 follows through the multi-layered control software architecture 50 (FIG. 2) of the one or more controllers 20. In response to receiving the fault 78, the health monitoring structure 60 generates a plurality of unique triggers as the fault 78 propagates throughout the multi-layered control software architecture 50.

Figure 5:
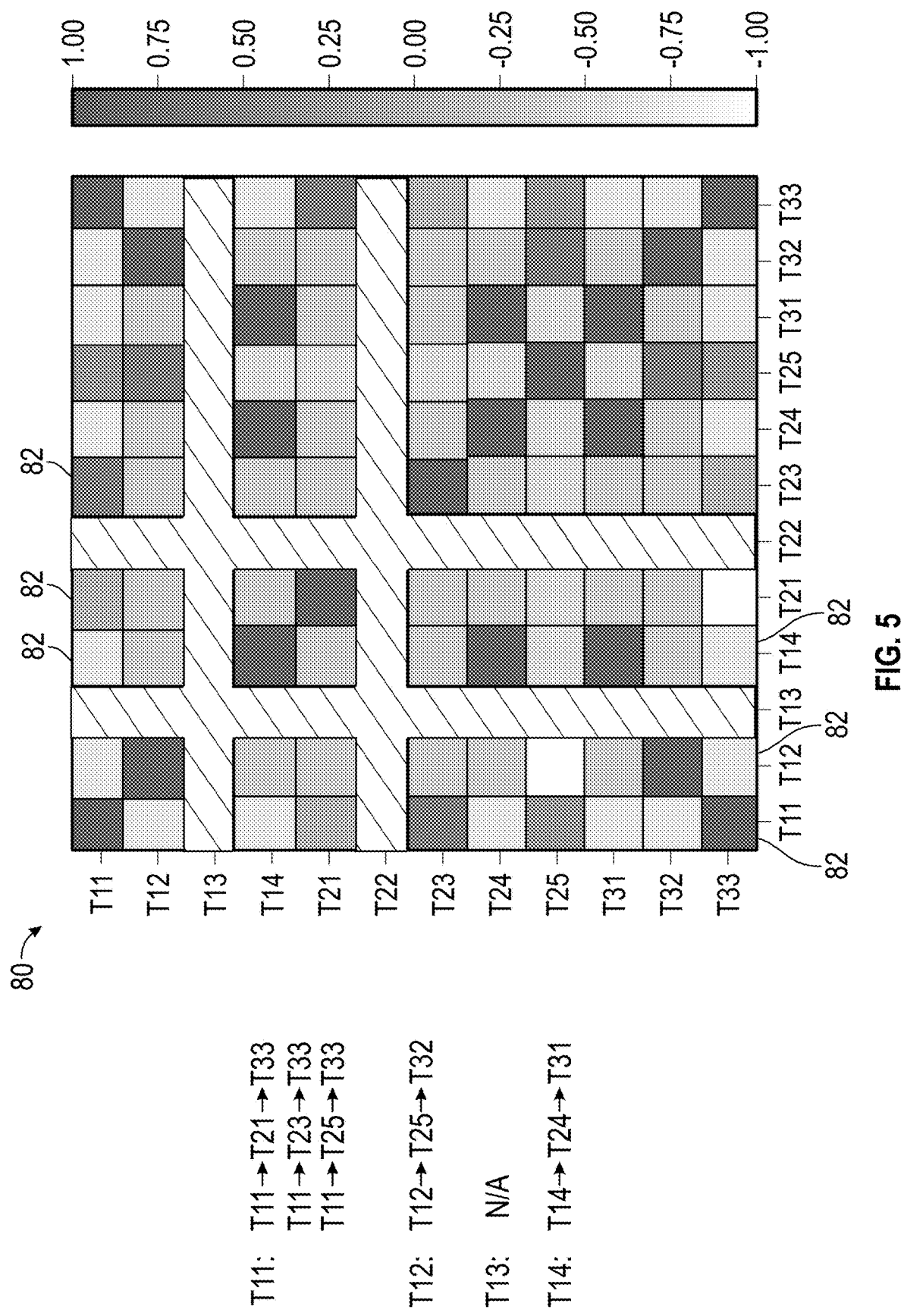
FIG. 5 illustrates a correlation heatmap showing a relationship between two unique triggers that are part of a plurality of unique triggers, where the plurality of unique triggers is generated by the health monitoring structure shown in FIG. 3, according to an exemplary embodiment.

FIG. 5 is an exemplary correlation heatmap 80 illustrating a relationship between two unique triggers for each of the plurality of unique triggers, where the plurality of unique triggers is generated by the health monitoring structure 60 (FIG. 3). The correlation heatmap 80 is a graph including a plurality of correlation coefficients 82, where each correlation coefficient 82 is determined between the two unique triggers. Referring to FIGS. 2, 4, and 5, the correlation analysis module 70 of the one or more controllers 20 determines the correlation coefficient 82 between two unique triggers that are generated as the fault 78 propagates through the multi-layered control software architecture 50, where the correlation coefficient 82 indicates a strength and a direction of a relationship between the two unique triggers. In the non-limiting example as shown in FIG. 5, the first three software layers 52 of the multi-layered control software architecture 50 are employed to generate the triggers, where a global software layer represents the global layer 52A (FIG. 2), a middle software layer represents the local layer 52B (FIG. 2), and a bottommost software layer represents the actuator requirement layer 52C (FIG. 2).

Referring specifically to FIG. 5, the bottommost software layer includes four unique triggers T11, T12, T13, and T14, the middle layer includes five unique triggers T21, T22, T23, T24, and T25, and the global software layer includes three unique triggers T31, T32, and T33. The correlation heatmap 80 illustrates the correlation coefficient 82 between two of the plurality of unique triggers. For example, the correlation coefficient 82 between the unique trigger T11 and T33 includes a value that approaches 1.0. A positive correlation coefficient 82 indicates the two unique triggers are related to one another in a positive direction, and a negative correlation coefficient indicates the two unique triggers are related to one another in a negative direction. The correlation coefficient 82 also indicates how the two unique triggers are connected to one another as part of a network 90 of the propagation paths 92, which is shown in FIG. 6.

Figure 6:
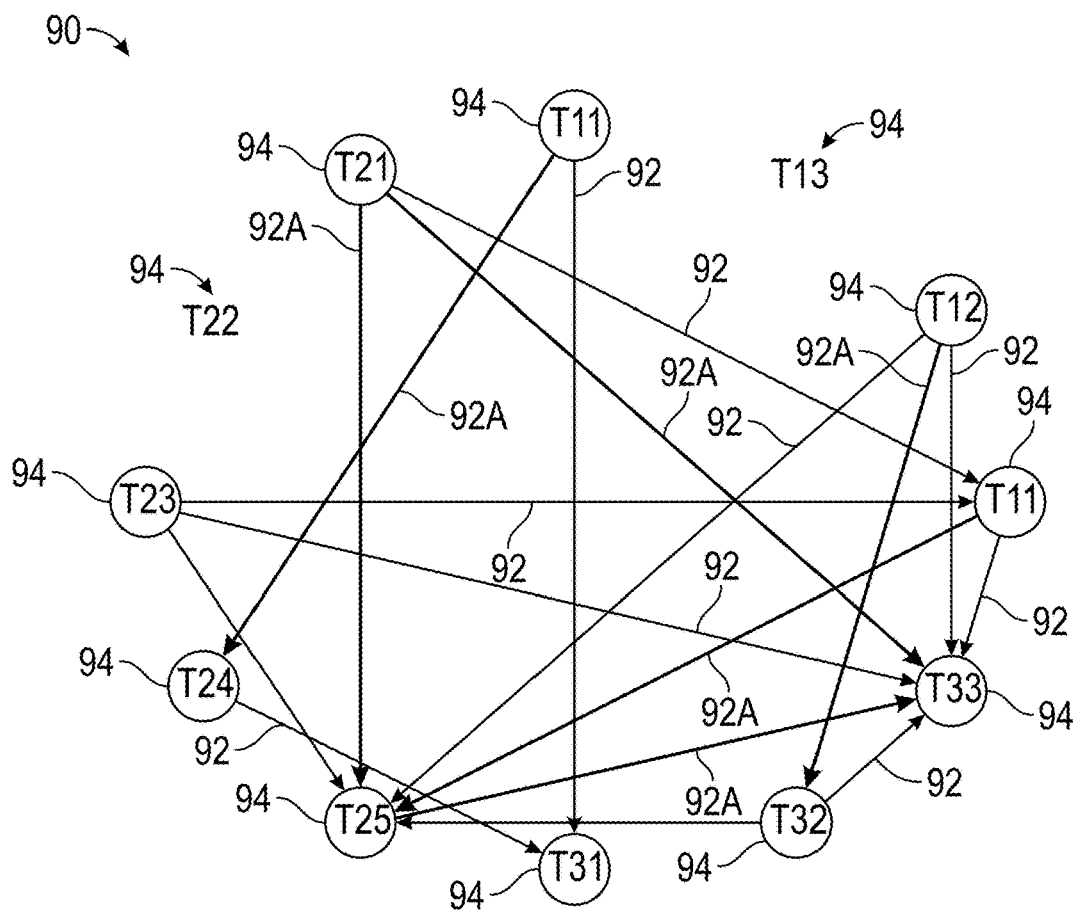
FIG. 6 illustrates a network of propagation paths that align with the correlation heatmap shown FIG. 5, according to an exemplary embodiment.

Referring to FIGS. 4-6, the network 90 includes the plurality of propagation paths 92 and a plurality of nodes 94. Each propagation path 92 connects two corresponding nodes 94 to one another. Moreover, each propagation path 92 represents when the fault 78 activates a first unique trigger in a lower software layer 52 and propagates to a higher software layer 52 to activate a second unique trigger, and the nodes 94 each represent one of the unique triggers. The network module 72 receives the correlation coefficient 82 from the correlation analysis module 70 and builds the network 90 based on a sign of the correlation coefficient 82. That is, the network 90 is built by identifying positive and negative correlation coefficients 82. In the embodiment as shown in FIGS. 4-6, unidirectional analysis, which is based on propagation timing, is employed to build the network 90. The network module 72 determines a propagation path 92 exists between two nodes 94 that are part of the network 90 when the correlation coefficient 82 is positive. For example, as seen in FIG. 5, a positive correlation coefficient 82 exists between the two unique triggers T33 and T21. Therefore, a propagation path 92 is created between the two nodes 94 that correspond to the unique triggers T33 and T21 as shown in FIG. 6.

The network 90 is also built based on invalid values for the correlation coefficient 82. The correlation analysis module 70 identifies the unique triggers that have not been activated, where an inactivated unique trigger results in an invalid correlation coefficient 82. An invalid correlation coefficient 82 is shown in hatched line in FIG. 5 for the unique trigger T13 and the unique trigger T22. Referring now to FIG. 6, two inactivated nodes 94, which include the nodes 94 corresponding to the unique triggers T13 and T22, are unconnected to the remaining nodes 94 that are part of the network 90. In the example as shown in FIG. 6, the node 94 corresponding to the unique trigger T22 and the node corresponding to the unique trigger T13 remain inactivated. In one example, the fault 78 may be injected into the bottom software layer to activate the unique trigger T11. The fault 78 may then propagate to the middle software layer to activate the unique trigger T25. The fault 78 may then propagate to the upper software layer to activate the unique trigger T33.

The network module 72 identifies one or more main propagation paths 94A of the network 90, which are illustrated in FIG. 6 with a bold line, based on a data analysis of a mock big data set. The mock big data set represents time characteristics of various faults that occur within the multi-layered control software architecture 50 (FIG. 2). The mock big data set is a big data set that includes various data points collected from multiple vehicles that capture a plurality of events over a time horizon. The data analysis identifies the one or more main propagation paths 92A by counting a number of times a plurality of faults travels through a specific propagation path 92 for each of the plurality of propagation paths 92 that are part of the network 90. The data analysis then selects the propagation paths 92 that the plurality of faults travels through most frequently as the one or more main propagation paths 92A.

Referring to FIGS. 4 and 6, the network module 72 then builds a complete propagation pathway that includes two or more main propagation paths 92A, where the complete propagation pathway follows the fault 78 from the bottommost software layer to the global software layer of the multi-layered control software architecture 50. In the present example, the bottommost software layer is the actuator requirement layer 52C (FIG. 2), and the global software layer is the global layer 52A (FIG. 2). In the example as shown in FIG. 6, one of the complete propagation pathways includes the main propagation path 92A extending from node T11 to node T25 and the main propagation path 92A extending from node T25 to node T33.

The root cause module 74 analyzes the network 90 to identify the root cause of the fault 78. First, the root cause module 74 determines a number of complete propagation pathways that exist within the network 90. A complete propagation pathway traces the fault 78 from the lower software layer to the upper software layer through a plurality of main propagation paths 94A. In one embodiment, only one main propagation pathway exists within the network 90, and therefore the root cause module 74 determines the root cause of the fault 78 based on the only one main propagation path 92A. Specifically, the root cause of the fault 78 is identified by tracing the complete propagation pathway back to the node 94 that corresponds to the unique trigger in the bottommost software layer 52. For example, if the fault 78 was injected into the bottom software layer to activate the unique trigger T11, then the root cause of the fault 78 is traced back to the unique trigger T11.

Once the root cause module 74 traces the fault back to the unique trigger T11 in the bottommost software layer, the root cause module 74 determines an identity of the unique trigger T11 in the bottommost software layer, where the identity of the unique trigger T11 indicates the root cause of the fault 78. Specifically, as an example, the health monitoring structure 60 (FIG. 3) generates the unique trigger T11 in response to determining the respective parameter of the respective software layer 52 (FIG. 2) does not meet the predetermined corresponding performance metric for the required time horizon. Therefore, in the present example, if the unique software trigger T11 was generated in response to determining a respective parameter calculated by the IMU 34 (FIG. 1) does not meet the predetermined corresponding performance metric for the required time horizon, the root cause module 74 determines the root cause of the fault 78 corresponding to the unique trigger T11 is a bias in the IMU 34.

In response to determining more than one main propagation path 92A exists within the network 90, the root cause module 74 confirms each of the more than one main propagation paths 92A are valid. If a specific main propagation path 92A is not valid, then the root cause module 74 removes the specific main propagation path 92A from consideration. In the event the root cause module 74 determines that more than one main propagation path 92A is valid, the root cause module 74 expresses each root cause as a probability. For example, the root cause may be expressed as bias within the IMU 34 (FIG. 1) having an eighty percent probability and as a fault with the tire radius estimation having a twenty percent probability.

The root cause module 74 of the one or more controller 20 confirms each of the more than one main propagation paths 92A are valid based on one of two approaches. In the first approach, the root cause module 74 confirms a specific main propagation path 92A is valid based on a timing signature of the specific main propagation path 92A. The timing signature of the specific main propagation path 92A represents a predetermined amount of time required for the fault 78 to propagate from one of the lower layers 52 of the multi-layered control software architecture 50 (FIG. 2) to a higher layer 52 of the multi-layered control software architecture 50. The predetermined amount of time included by the timing signature is measured between a first point in time when the fault 78 is received by the lower software layer 52 and generates the first unique trigger and a second point in time when the fault 78 propagates to the higher level software layer 52 and generates the second unique trigger. It is to be appreciated that each of the plurality of propagation paths 92 of the network 90 includes a respective timing signature with a unique predetermined amount of time that is measured between the first unique trigger and the second unique trigger.

The root cause module 74 measures an actual amount of time between the first point in time and the second point in time as the fault 78 travels from the lower software layer 52 to the higher software layer 52 for the specific main propagation path 92A, and compares the actual amount of time with the predetermined amount of time. In response to determining the actual amount of time is equal to the predetermined amount of time, the root cause module 74 determines the specific main propagation path 92A is valid. For example, the fault 78 may be injected into the bottom software layer to activate the unique trigger T11 and then propagates to the middle software layer to activate the unique trigger T25. The predetermined amount of time for the specific main propagation path 92A between the unique trigger T11 and unique trigger T25 is seven milliseconds. However, if the root cause module 74 determines the actual amount of time between the first point in time and the second point in time is actually twelve milliseconds, then the specific main propagation path 92A is not valid.

Figure 7:
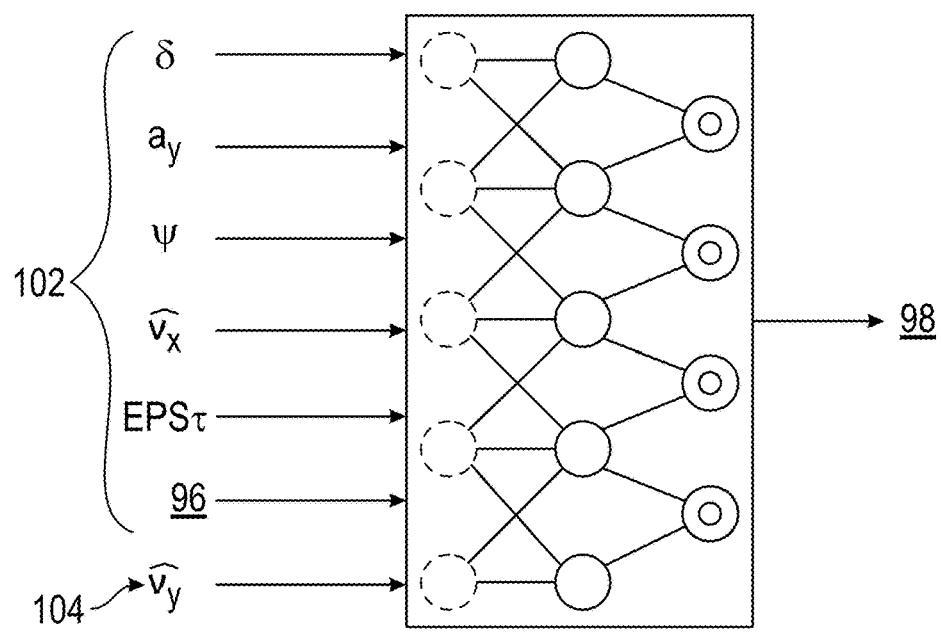
FIG. 7 is a diagram of a machine learning model employed by the one or more controllers shown in FIG. 4, according to an exemplary embodiment.

In the second approach, the root cause module 74 of the one or more controllers 20 confirms each of the more than one main propagation paths 92A are valid based on a machine learning model 100, which is shown in FIG. 7 or, alternatively, a hybrid model that is a combination of a physics-based model and the machine learning model 100. The physics-based model includes one or more equations that solve for the one or more parameters estimated by a respective estimator layer 56. The number of equations in the physics-based model depend upon a number of degrees of freedom. One example of the physics-based model is a lateral velocity estimation model that combines a drift-type fault detection model and a bias-type fault detection model together. The drift-type fault detection model determines a drift-type fault, which is sometimes referred to as a slope-type fault, that manifests in an estimated lateral velocity $\hat{V}_y$ over time. The bias-type fault detection model is a pneumatic trail bias-type fault detection model that determines an expected slip angle. The bias-type fault detection model estimates a pneumatic trail based on, or as a function of, self-aligning torque and lateral forces. It is to be appreciated that the bias-type fault detection model determines the expected slip angle independently of the estimated lateral velocity $\hat{V}_y$. The expected slip angle is then utilized to determine a vertical bias in the estimated lateral velocity $\hat{V}_y$. The lateral velocity estimation model generates a fault flag when both the drift-type fault and the bias-type fault are both present. It is to be appreciated that while a lateral velocity estimation model is described, the physics-based model may detect faults in other types of estimates as well.

In the non-limiting embodiment as shown in FIG. 7, the machine learning model 100 employs a neural network, however, it is to be appreciated that other machine learning techniques may be used as well. The machine learning model 100 receives a plurality of inputs 102 and a reference signal 104, where the plurality of inputs 102 are employed by the machine learning model 100 to calculate the reference signal 104. As shown in FIG. 7, the plurality of inputs 102 include a steering angle δ, lateral acceleration $a_y$, yaw rate $\dot{\psi}$, longitudinal velocity $\hat{V}_x$, an electric power steering torque feedback EPS τ, and positional data 96 collected from the GPS 38 (FIG. 1) and the reference signal 104 is the estimated lateral velocity $\hat{V}_y$. The machine learning model 100 generates an output 98 indicating the root cause of the fault 78, if applicable. For example, the root cause of the fault 78 may be model error, bias in the steering angle δ, bias in the lateral acceleration $a_y$, bias in the yaw rate $\dot{\psi}$, drift in the steering angle δ, drift in the lateral acceleration $\alpha_y$, or drift in the yaw rate $\dot{\psi}$.

As mentioned above, the hybrid model is a combination the physics-based model and the machine learning model 100 together, where the physics-based model is employed as a constraint for the reference signal 104 received by the machine learning model 100. For example, a physics-based model may be used to calculate the estimated lateral velocity $\hat{V}_y$ in the example as shown in FIG. 7 using the following equation: $\hat{V}_y = a_y - \dot{\psi} \times \hat{V}_x$.

Figure 8:
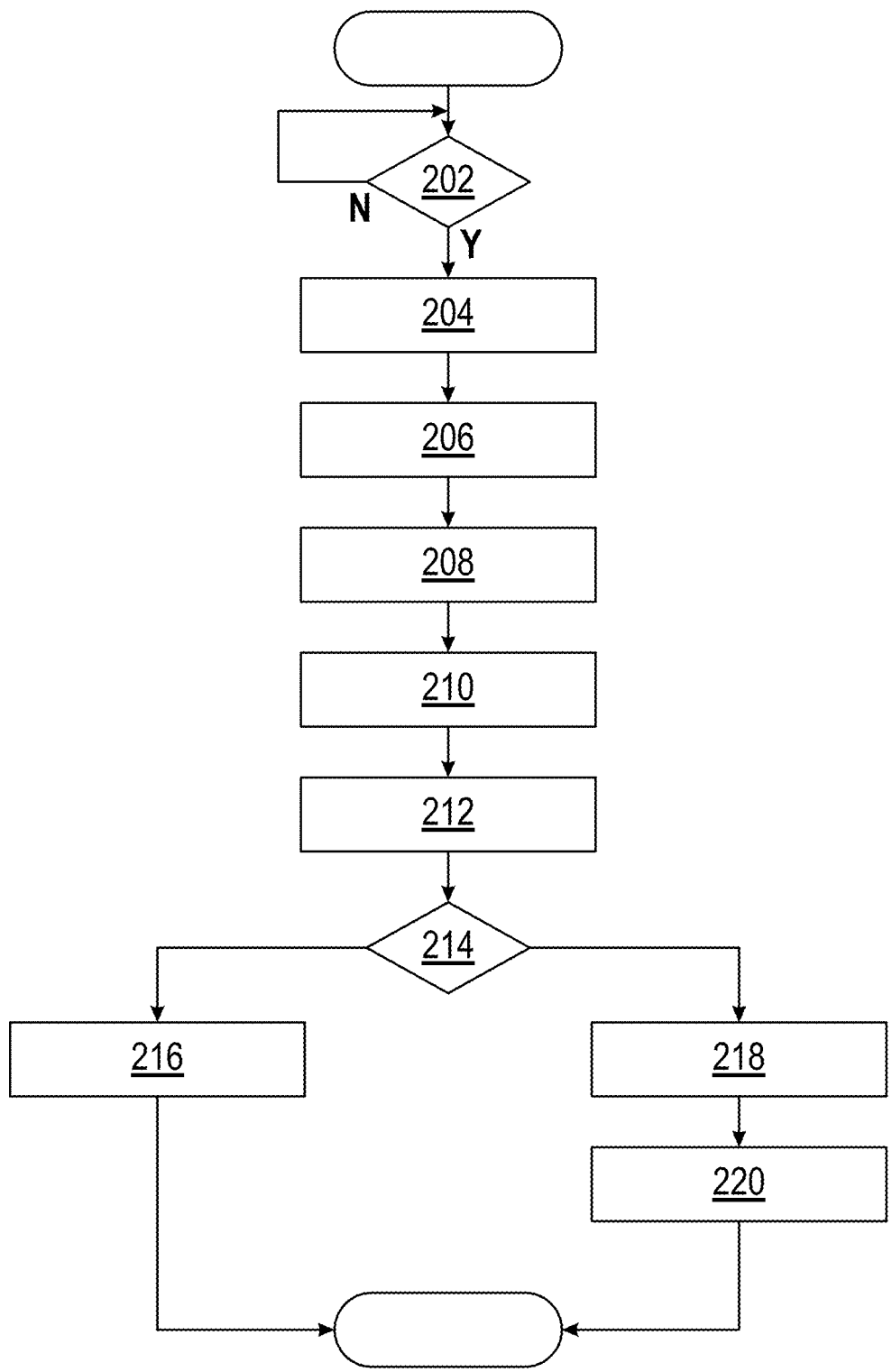
FIG. 8 is a process flow diagram illustrating a method for determining a root cause of the fault by the data analytics system, according to an exemplary embodiment.

FIG. 8 is an exemplary process flow diagram illustrating a method 200 for determining a root cause of the fault 78 by the data analytics system 10. Referring generally to FIGS. 1-8, the method 200 may begin at decision block 202. In block 202, the health monitoring structure 60 (FIG. 3) continues to monitor the multi-layered control software architecture 50 until receiving the fault 78. In response to receiving the fault 78, the method 200 may proceed to block 204.

In block 204, in response to receiving the fault 78, the health monitoring structure 60 generates a plurality of unique triggers as the fault 78 propagates throughout the multi-layered control software architecture 50 (FIG. 2). The method 200 may then proceed to block 206.

In block 206, the correlation analysis module 70 of the one or more controllers 20 determines the correlation coefficient 82 (seen in FIG. 5) between two unique triggers for each of the plurality of unique triggers to create the correlation heatmap 80. The method 200 may then proceed to block 208.

In block 208, the network module 72 of the one or more controllers 20 builds the network 90 (FIG. 6) based on the correlation coefficient 82 for each of the plurality of unique triggers. As mentioned above, the network 90 includes a plurality of propagation paths 92 (FIG. 6), where each propagation path 92 represents when the fault 78 activates the first unique trigger in a lower software layer and propagates to the higher software layer to activate a second unique trigger. The method 200 may then proceed to block 210.

In block 210, the network module 72 of the one or more controllers 20 identifies one or more main propagation paths 92A (FIG. 6) that are part of the network 90 based on a data analysis of a mock data set that is a mock big data set. The method 200 may then proceed to block 212.

In block 212, the network module 72 of the one or more controllers 20 builds a complete propagation pathway that includes two or more main propagation paths 92A, where the complete propagation pathway follows the fault 78 from a bottommost software layer to a global software layer of the multi-layered control software architecture 50 (FIG. 2). The method 200 may then proceed to decision block 214.

In decision block 214, the root cause module 74 of the one or more controllers 20 determines a number of main propagation paths within the network 90. In response to determining only one main propagation path exists within the network 90 the method proceeds to block 216. In block 216, the one or more controllers 20 determine a root cause of the fault 78 based on the only one main propagation path. The method 200 may then terminate. However, in response to determining more than one main propagation path exists within the network 90, the method 200 may proceed to block 218.

In block 218, the root cause module 74 of the one or more controllers 20 confirm each of the more than one main propagation paths are valid. Specifically, as mentioned above, root cause module 74 of the one or more controller 20 confirms each of the more than one main propagation paths 92A are valid based on one of two approaches. In the first approach, the root cause module 74 confirms a specific main propagation path 92A is valid based on a timing signature of the specific main propagation path 92A. In the second approach, the root cause module 74 of the one or more controllers 20 confirms each of the more than one main propagation paths 92A are valid based on a machine learning model 100 shown in FIG. 7. The method 200 may then proceed to block 220.

In block 220, the root cause module 74 of the one or more controllers 20 determine more than one potential root cause exists and expresses each root cause as a probability. The method 200 may then terminate.

Referring generally to the figures, the disclosed data analytics system provides various technical effects and benefits. Specifically, the data analytics system provides a custom-made analytic approach to identify a root cause of a fault received by the one or more controllers. Specifically, the disclosed approach not only identifies the root cause of the fault, but also determines the propagation paths the fault follows through the multi-layered control software architecture as well. In contrast, conventional approaches to determine a root cause of the fault rely on the specialized knowledge of an individual, such as a subject matter expert.

The controllers may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers may be microprocessor-based such as a computer having a at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A data analytics system for a vehicle, the data analytics system comprising:
   one or more controllers including a multi-layered control software architecture including two or more software layers and a health monitoring structure, the one or more controllers executing instructions to:
   receive a fault;
   in response to receiving the fault, generate, by the health monitoring structure, a plurality of unique triggers as the fault propagates throughout the multi-layered control software architecture;
   build a network including a plurality of propagation paths, wherein each propagation path represents when the fault activates a first unique trigger in a lower software layer and propagates to a higher software layer to activate a second unique trigger;
   identify one or more main propagation paths that are part of the network based on a data analysis of a mock big data set;
   build a complete propagation pathway that includes two or more main propagation paths, wherein the complete propagation pathway follows the fault from a bottommost software layer to a global software layer of the multi-layered control software architecture; and
   in response to determining only one main propagation path exists within the network, determine a root cause of the fault based on the only one main propagation path.

2. The data analytics system of claim 1, wherein the one or more controllers execute instructions to:
   in response to determining more than one main propagation path exists within the network, confirm each of the more than one main propagation paths are valid.

3. The data analytics system of claim 2, wherein the one or more controllers execute instructions to:
   confirm a specific main propagation path is valid based on a timing signature of the specific main propagation path, wherein the timing signature indicates a predetermined amount of time.

4. The data analytics system of claim 3, wherein the predetermined amount of time is measured between a first point in time when the fault is received by the lower software layer and generates the first unique trigger and a second point in time when the fault propagates to the higher level software layer and generates the second unique trigger.

5. The data analytics system of claim 2, wherein the one or more controllers execute instructions to:
   confirm a specific main propagation path is valid based on a machine learning model.

6. The data analytics system of claim 2, wherein the one or more controllers execute instructions to:
   determine more than one potential root cause exists; and
   express each root cause as a probability.

7. The data analytics system of claim 1, wherein the root cause of the fault is determined by:
   tracing the complete propagation pathway back to a node that corresponds to a unique trigger that is part of the plurality of unique triggers in a bottommost software layer; and
   determining an identity of the unique trigger in the bottommost software layer, wherein the identity of the unique trigger indicates the root cause of the fault.

8. The data analytics system of claim 1, wherein the one or more controllers execute instructions to:
   determine a correlation coefficient between two unique triggers for each of the plurality of unique triggers.

9. The data analytics system of claim 8, wherein the one or more controllers execute instructions to:
   build the network including the plurality of propagation paths based on a sign of the correlation coefficient for each of the plurality of unique triggers.

10. The data analytics system of claim 9, wherein the network includes a plurality of nodes that each represent one of the unique triggers.

11. The data analytics system of claim 10, wherein each propagation path connects two corresponding nodes to one another.

12. The data analytics system of claim 1, wherein the mock big data set is a big data set that includes various data points collected from multiple vehicles that capture a plurality of events over a time horizon.

13. The data analytics system of claim 12, wherein the data analysis includes identifying the one or more main propagation paths by:
   counting a number of times a plurality of faults travels through a specific propagation path for each of the plurality of propagation paths that are part of the network; and
   selecting propagation paths that the plurality of faults travels through most frequently as the one or more main propagation paths.

14. The data analytics system of claim 1, wherein the data analysis identifies the one or more main propagation paths by counting a number of times a plurality of faults travels through a specific propagation path for each of the plurality of propagation paths that are part of the network.

15. A method for determining a root cause of a fault by a data analytics system for a vehicle, the method comprising:
   receiving, by one or more controllers, a fault, wherein the one or more controllers including a multi-layered control software architecture including two or more software layers and a health monitoring structure;
   in response to receiving the fault, generating, by the health monitoring structure, a plurality of unique triggers as the fault propagates throughout the multi-layered control software architecture;
   building a network including a plurality of propagation paths, wherein each propagation path represents when the fault activates a first unique trigger in a lower software layer and propagates to a higher software layer to activate a second unique trigger;

identifying one or more main propagation paths that are part of the network based on a data analysis of a mock big data set;

building a complete propagation pathway that includes two or more main propagation paths, wherein the complete propagation pathway follows the fault from a bottommost software layer to a global software layer of the multi-layered control software architecture; and in response to determining only one main propagation path exists within the network, determining a root cause of the fault based on the only one main propagation path.

16. A data analytics system for a vehicle, the data analytics system comprising:

one or more controllers including a multi-layered control software architecture including two or more software layers and a health monitoring structure, the one or more controllers executing instructions to:

receive a fault;

in response to receiving the fault, generate, by the health monitoring structure, a plurality of unique triggers as the fault propagates throughout the multi-layered control software architecture;

build a network including a plurality of propagation paths, wherein each propagation path represents when the fault activates a first unique trigger in a lower software layer and propagates to a higher software layer to activate a second unique trigger;

identify one or more main propagation paths that are part of the network based on a data analysis of a mock big data set;

build a complete propagation pathway that includes two or more main propagation paths, wherein the complete propagation pathway follows the fault from a bottommost software layer to a global software layer of the multi-layered control software architecture;

in response to determining only one main propagation path exists within the network, determine a root cause of the fault based on the only one main propagation path; and in response to determining more than one main propagation path exists within the network, confirm each of the more than one main propagation paths are valid based on one of the following: a timing signature of a specific main propagation path and a machine learning model.

17. The data analytics system of claim 16, wherein a predetermined amount of time is measured between a first point in time when the fault is received by the lower software layer and generates the first unique trigger and a second point in time when the fault propagates to the higher level software layer and generates the second unique trigger.

18. The data analytics system of claim 16, wherein the one or more controllers execute instructions to:

determine more than one potential root cause exists; and express each root cause as a probability.

19. The data analytics system of claim 16, wherein the root cause of the fault is determined by:

tracing the complete propagation pathway back to a node that corresponds to a unique trigger that is part of the plurality of unique triggers in a bottommost software layer; and determining an identity of the unique trigger in the bottommost software layer, wherein the identity of the unique trigger indicates the root cause of the fault.

20. The data analytics system of claim 16, wherein the one or more controllers execute instructions to:

determine a correlation coefficient between two unique triggers for each of the plurality of unique triggers; and build the network including the plurality of propagation paths based on a sign of the correlation coefficient for each of the plurality of unique triggers.

* * * * *